UNITED STATES PATENT OFFICE 2,484,727

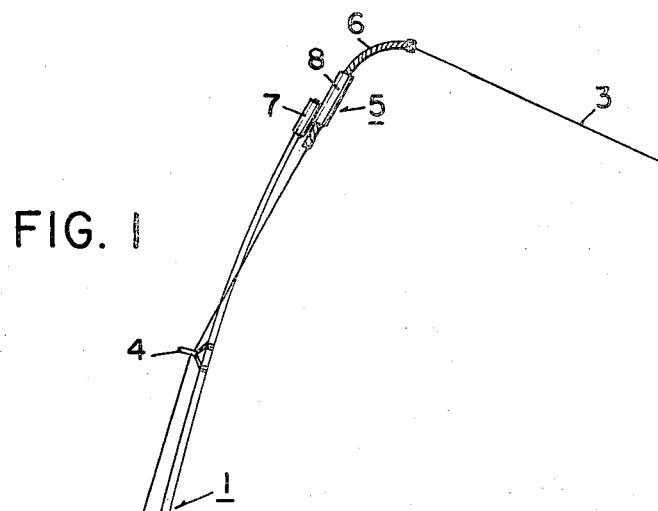
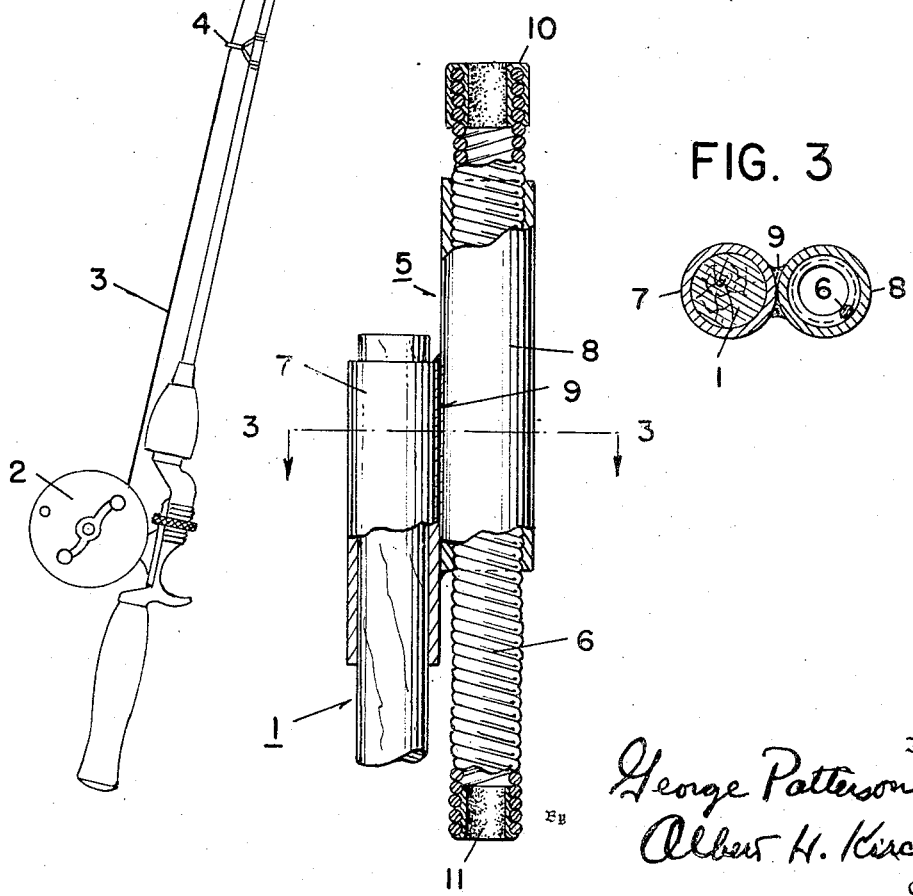

FISHING ROD TIP

George Patterson, Seattle, Wash.

Application November 12, 1946, Serial No. 709,376

6 Claims. (Cl. 43—24)

The present invention relates to fishing rods and more particularly to line guides for the tip ends of such rods.

Different kinds of fishing require rods of different flexibility characteristics. Thus, for example, most kinds of so called salt water fishing require the use of relatively rigid rods, while fly casting and trout and bass fishing are best done with rods having considerably more flexibility. Thus far, so far as I am aware, no single rod has been made adjustable as to flexibility so as to permit it to be used interchangeably for two different kinds of fishing operations.

A primary purpose of the present invention is to provide an attachment for a rod by which the effective flexibility of the rod may be adjusted within reasonably wide limits.

This is accomplished by installing on the tip end of the rod a line guide whose flexibility can be adjusted so as to make what is virtually the rod itself more or less flexible or rigid within a fairly wide range of limits with the result that the line, throughout the zone from which it issues from the tip end of the rod, will be supported relatively stiffly or relatively flexibly, at the option of the fisherman, effected by a simple adjustment of the tip on the rod.

A related object is to provide a device of the character indicated which will be inexpensive to make, fool-proof and unfailing in operation, and durable throughout a long period of use.

Broadly speaking, the device comprises a tubular guide for the line, made of laterally flexible material, mounted on the end of the rod by means which will permit it to be extended more or less, through an adjustable range, from a rigid base or socket secured to the rod, so that the lateral flexibility of the projecting portion may be increased or decreased at will and thus impart an adjusted degree of flexibility to the length of line at the zone where the line issues from the rod. The resultant effect is thus similar to that which is produced by making the rod itself flexible or rigid as may be desired.

The accompanying drawing illustrates an embodiment of the invention which has been tested in actual use and found satisfactory and which is therefore at present preferred by me, although the invention is capable of being embodied in other different and modified forms, all within its spirit and within the scope of the apended claims.

In the drawing,

Figure 1 is a side elevational view of a fishing rod provided with a novel tip construction incorporating the principles of the present invention;

Fig. 2 is a side elevational view, on a relatively enlarged scale, showing the tip end of the rod with the attachment in place, partly broken away to show its internal construction; and Fig. 3 is a cross-sectional view taken on the line 3—3 of Fig. 2.

Referring to the drawing, Fig. 1 shows a more or less conventional type of fishing rod 1 having the usual reel 2 from which a line 3 extends through intermediate guides 4 to issue from a tip guide at the forward end of the rod. Ordinarily the tip guide is similar to the intermediate guides. However, the present invention provides a novel type of tip guide, and it is to this part of Fig. 1 that the invention relates, no other portion of the structure there shown forming any part of the invention.

The new tip guide is designated 5 and is shown on a relatively enlarged scale in Fig. 2. In the preferred embodiment it includes a laterally flexible tube 6 through which the line extends and which is mounted in rigid means supported on the end of the rod in such a way that more or less of the flexible tube can be fitted down into and held against bending by the rigid means or can be extended therefrom so as to expose more or less of its length and thereby increase the flexibility of the support which the tube provides for the line.

In the preferred embodiment the supporting means comprises a pair of rigid metallic sleeves permanently secured together side by side so that the sleeves are fixed together in parallel relation. One of these sleeves, designated 7, is open at one end and may be closed or left open at the other end, but in either case it is so proportioned as to frictionally fit the tip end of the rod 1. The other sleeve, designated 8, may be secured to the first sleeve as by solder 9 and preferably extends out a short distance beyond the end of the first sleeve. The sleeve 8 is adapted to receive the flexible tube 6 and to hold it in adjustably extended relation.

I find it convenient, in order to incorporate flexibility in the tube 6 and to provide for its lengthwise adjustability in the sleeve 8, to make the tube of closely coiled spring wire and to provide the sleeve 8 with an internal thread with which the convolutions of the wire will mesh. These threads are best shown in Fig. 2. By this construction adjustability is obtained by simply screwing the tube 6 more or less down into the sleeve 8. The inherent friction of the thread engagement is sufficient to hold the adjustment at any predetermined setting throughout long periods of use, since in use there is no particular stress applied to the tube and sleeve tending to turn the threads relatively on each other.

When the tube 6 is made of coiled wire I find it desirable to dip its outer protruding end portion into solder or the equivalent to coat that end portion and provide a collar 10 which performs the double function of bonding the terminal convolutions together so as to prevent their separation or endwise expansion and of providing a smooth guideway for the line. If this solder coating is carried on the outside as well as the inside surface of the tube, the resulting outer protuberance or enlargement serves as a stop for keeping the terminal end of the tube from being turned entirely down inside the sleeve 8.

A similar solder coating 11 may be formed on the inside only of the other or inner end of the tube 6 to hold the wire turns in place and provide at this point a smooth guide for the line. External coating or enlargement should be avoided at this end, so as not to prevent threading of this end of the tube into the sleeve 8.

In use, the attachment is mounted as shown in Figs. 1 and 2 and the line 3 is passed through the tube 6. Assuming that the rod 1 is fairly rigid, over-all rigidity of the entire equipment may be maintained by turning the tube 6 substantially down toward its limit in the sleeve 8, to the position shown in Fig. 2. However, if the effect of a more flexible rod is desired, it is necessary only to unscrew the tube a greater or less distance from the sleeve 8, to somewhat the position shown in Fig. 1. With the parts thus arranged, the pulling of a fish on the line will cause the long projecting portion of the tube 6 to flex laterally, with very much the effect of flexing by the rod. Similar results are obtained in casting, where bending of the tube 6 produces an action much like that of the bending of a flexible rod.

All parts of the structure are made of metal, and they are preferably cadmium plated or otherwise treated so as to be proof against rusting and corrosion.

It is believed to be clear to those skilled in the art that the invention may be embodied in practicable form without employing the specific structure herein shown and described. Thus, for example, means other than the sleeve 7 may be used to secure the flexible tube in adjusted protruding relations to a fixed socket on the rod but I have described the combination as including the sleeve 7 because that is the preferred embodiment which has proved most satisfactory in actual use. Reference is made to the appended claims for definitions of the scope of the invention.

I claim:

1. A line guide for the tip end of a fishing rod comprising a pair of sleeve portions fixed together in side by side relation, one of said sleeve portions being engageable over the end of a fishing rod, and a tube having a laterally flexible end portion adjustably extensible from the other sleeve portion adapted to have a line mounted on the fishing rod passed therethrough.

2. A line guide for the tip end of a fishing rod comprising a pair of sleeve portions fixed together in side by side relation, one of said sleeve portions being engageable over the end of a fishing rod, and a tube frictionally held in the other sleeve portion and having a laterally flexible end portion adjustably extended from said other sleeve portion and adapted to have a line mounted on the fishing rod passed therethrough.

3. A line guide for the tip end of a fishing rod comprising a pair of sleeve portions fixed together in side by side relation, one of said sleeve portions being engageable over the end of a fishing rod and the other being internally threaded, and an externally threaded tube adjustably engaged in the other sleeve portion and having a laterally flexible end portion extending from said sleeve portion and adapted to have a line mounted on the fishing rod passed therethrough.

4. A line guide for the tip end of a fishing rod comprising a pair of sleeve portions fixed together in side by side relation, one of said sleeve portions being engageable over the end of a fishing rod and the other being internally threaded, and a resilient tube comprising a coil of spring wire threaded in the other sleeve portion so as to be adjustably extensible therefrom and adapted to have a line mounted on the fishing rod passed therethrough.

5. A line guide for the tip end of a fishing rod comprising a pair of sleeve portions fixed together in side by side relation, one of said sleeve portions being engageable over the end of a fishing rod and the other being internally threaded, and a resilient tube comprising a coil of spring wire threaded in the other sleeve portion so as to be adjustably extensible therefrom and adapted to have a line mounted on the fishing rod passed therethrough, the outer end coils of the resilient tube being soldered together to fix them in place and to provide a smooth guide for the line.

6. A line guide for the tip end of a fishing rod comprising a resilient coil element forming a laterally flexible tube adapted to have a line mounted on the rod passed therethrough, and a rigid tubular member secured to the tip end of the rod and having an internal screwthread meshed with the outer surface of said coil element whereby the coil element is mounted on the rod for lengthwise adjustment by rotation in the tubular member so as to extend more or less of the length of the coil element from the tubular member to vary the effective flexibility of the support afforded to the line by the coil element.

GEORGE PATTERSON.

REFERENCES CITED

The following references are of record in the file of this patent:

UNITED STATES PATENTS

| Number | Name | Date |
|---|---|---|
| 198,879 | Fisher | Jan. 1, 1878 |
| 218,452 | Ricker | Aug. 12, 1879 |
| 343,802 | Everett | June 15, 1886 |

FOREIGN PATENTS

| Number | Country | Date |
|---|---|---|
| 6,832 | Great Britain | 1902 |